Dec. 15, 1942.     G. H. HARRED     2,305,418
WIRE STITCHING MACHINE
Filed May 10, 1941     9 Sheets—Sheet 4
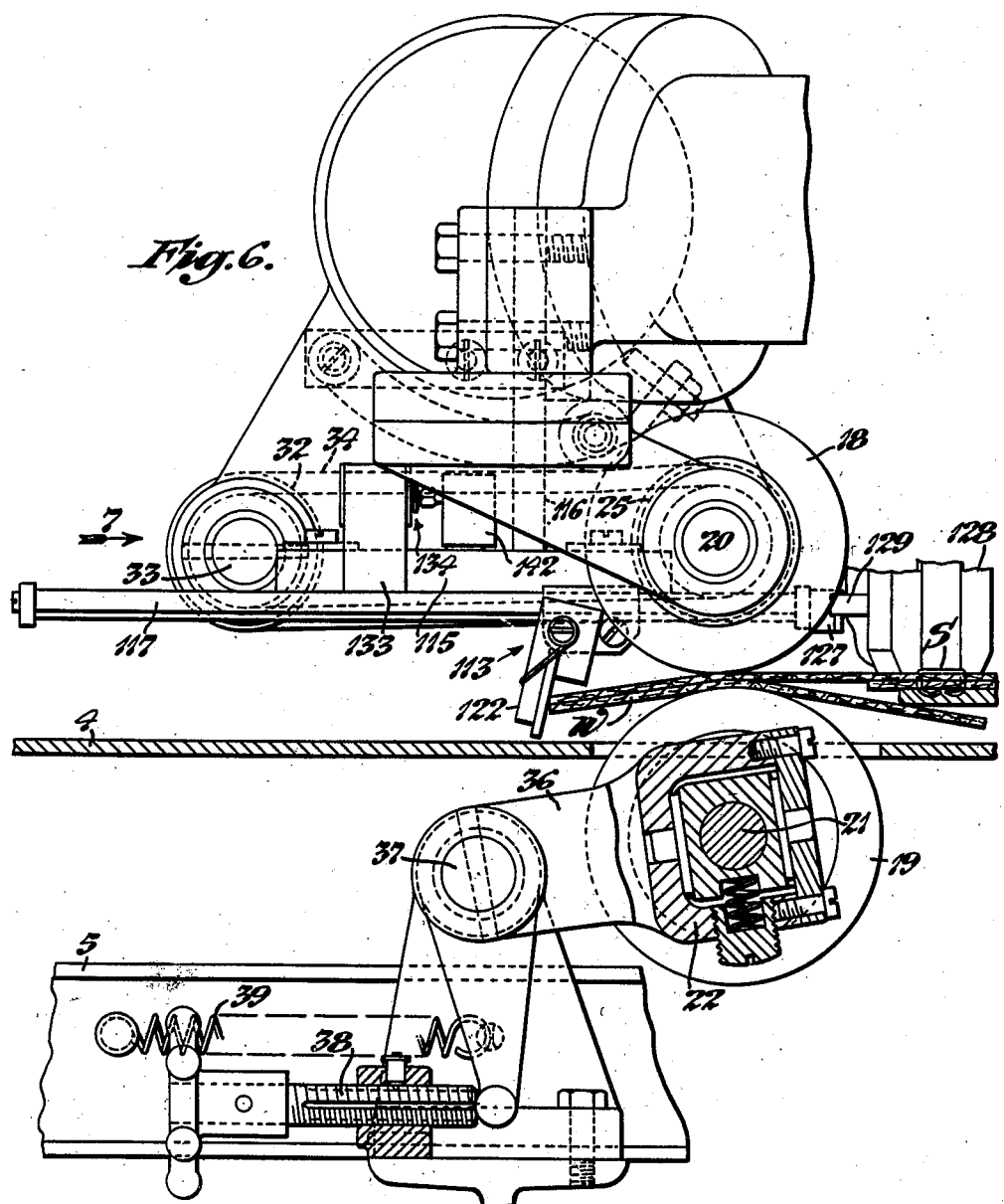
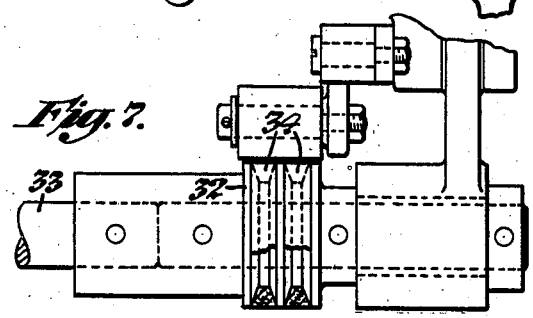
Inventor:
George H. Harred
By Pennington White
Attorneys.

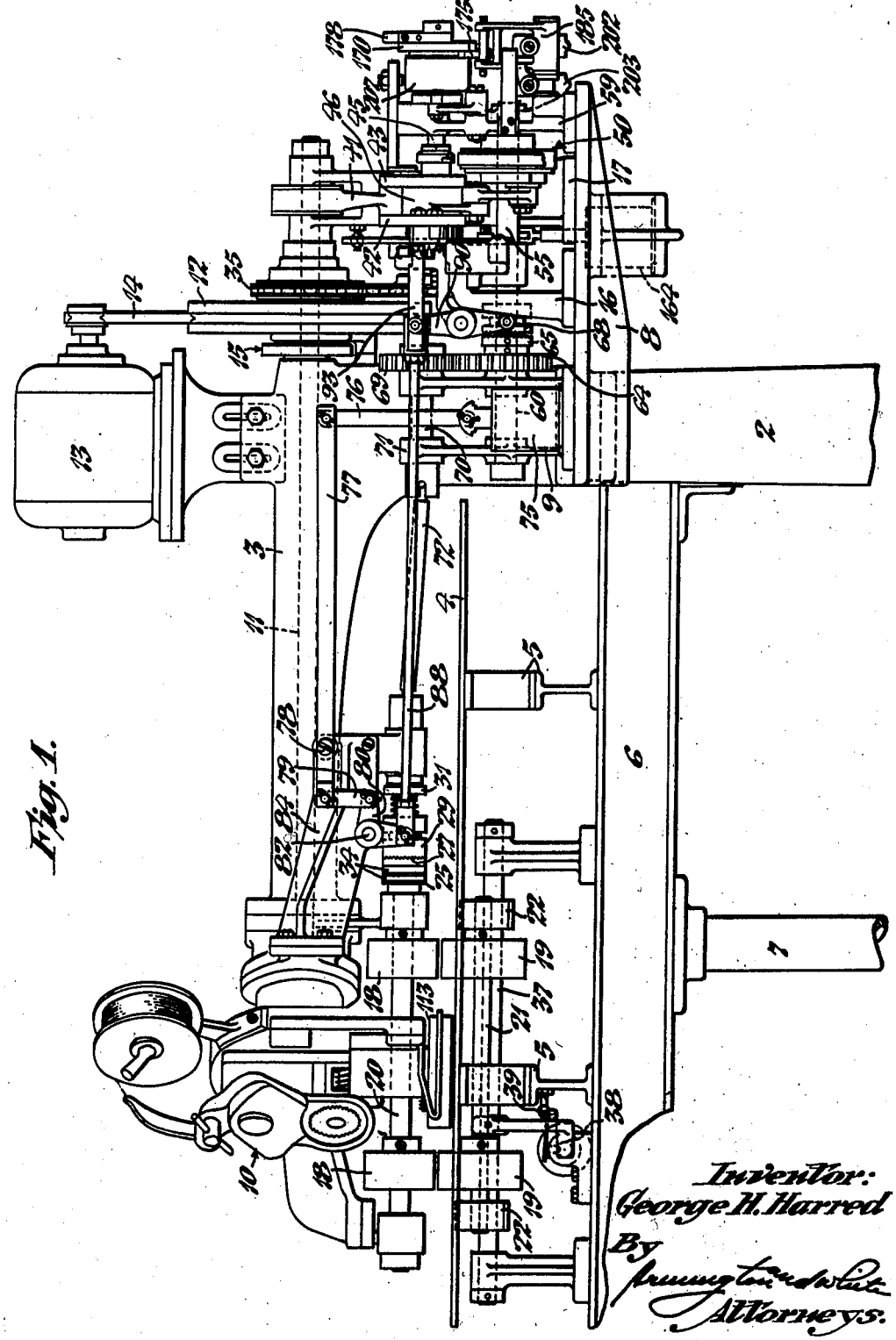

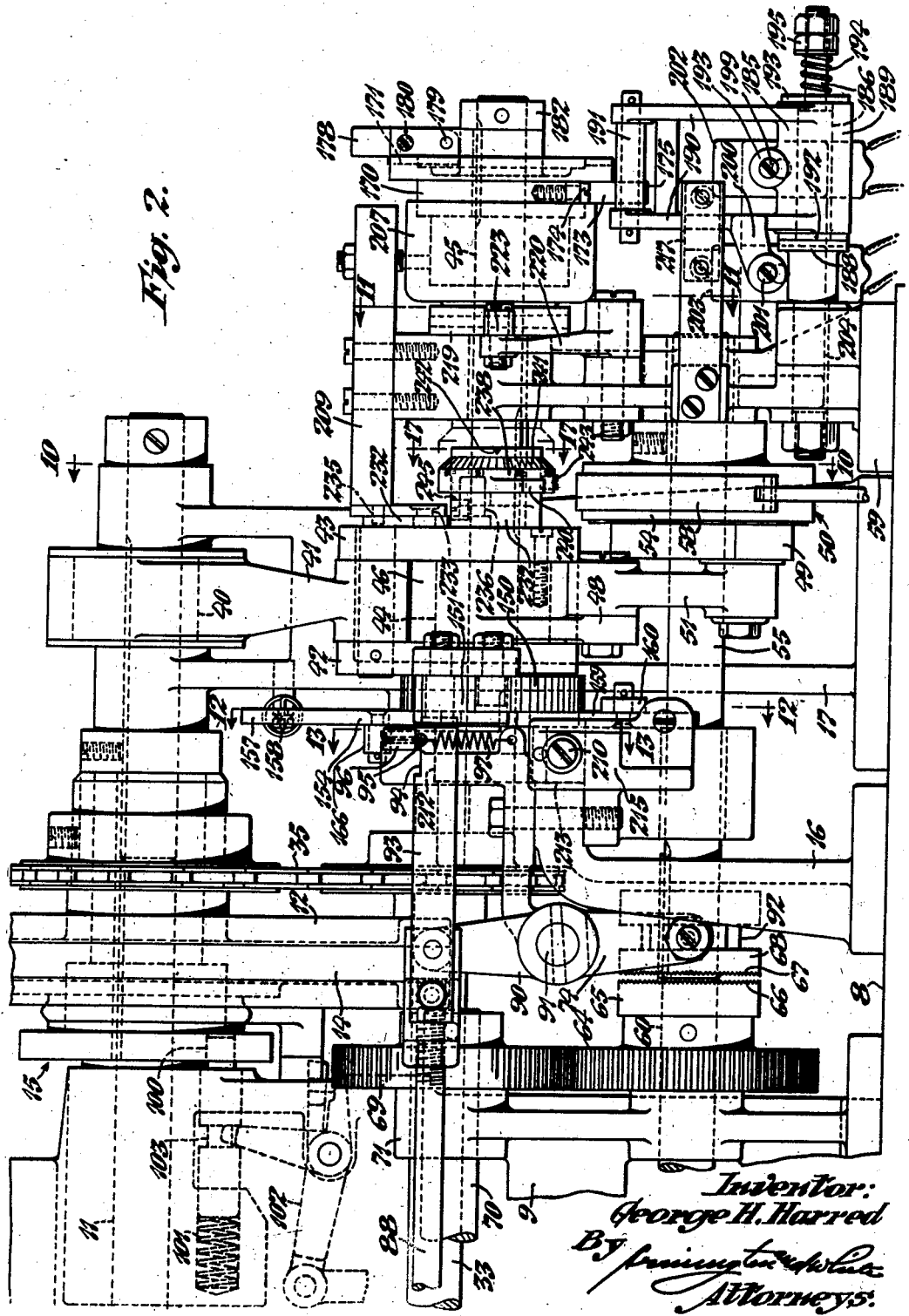

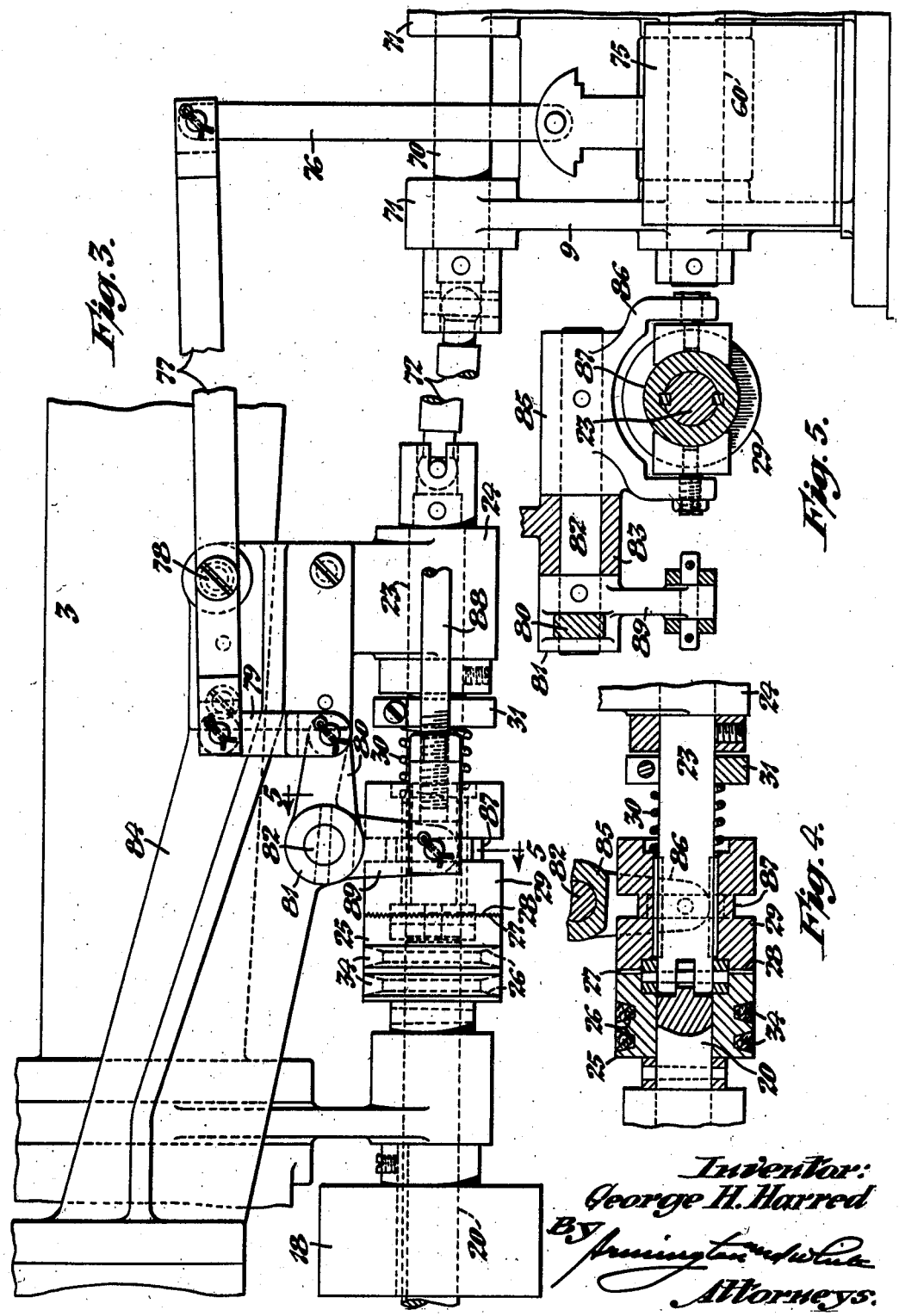

Dec. 15, 1942.   G. H. HARRED   2,305,418
WIRE STITCHING MACHINE
Filed May 10, 1941   9 Sheets-Sheet 5

Inventor:
George H. Harred
By
Pennington and White
Attorneys.

Dec. 15, 1942.    G. H. HARRED    2,305,418
WIRE STITCHING MACHINE
Filed May 10, 1941    9 Sheets-Sheet 6

Inventor:
George H. Harred
By
Attorneys.

Dec. 15, 1942.  G. H. HARRED  2,305,418
WIRE STITCHING MACHINE
Filed May 10, 1941   9 Sheets-Sheet 7
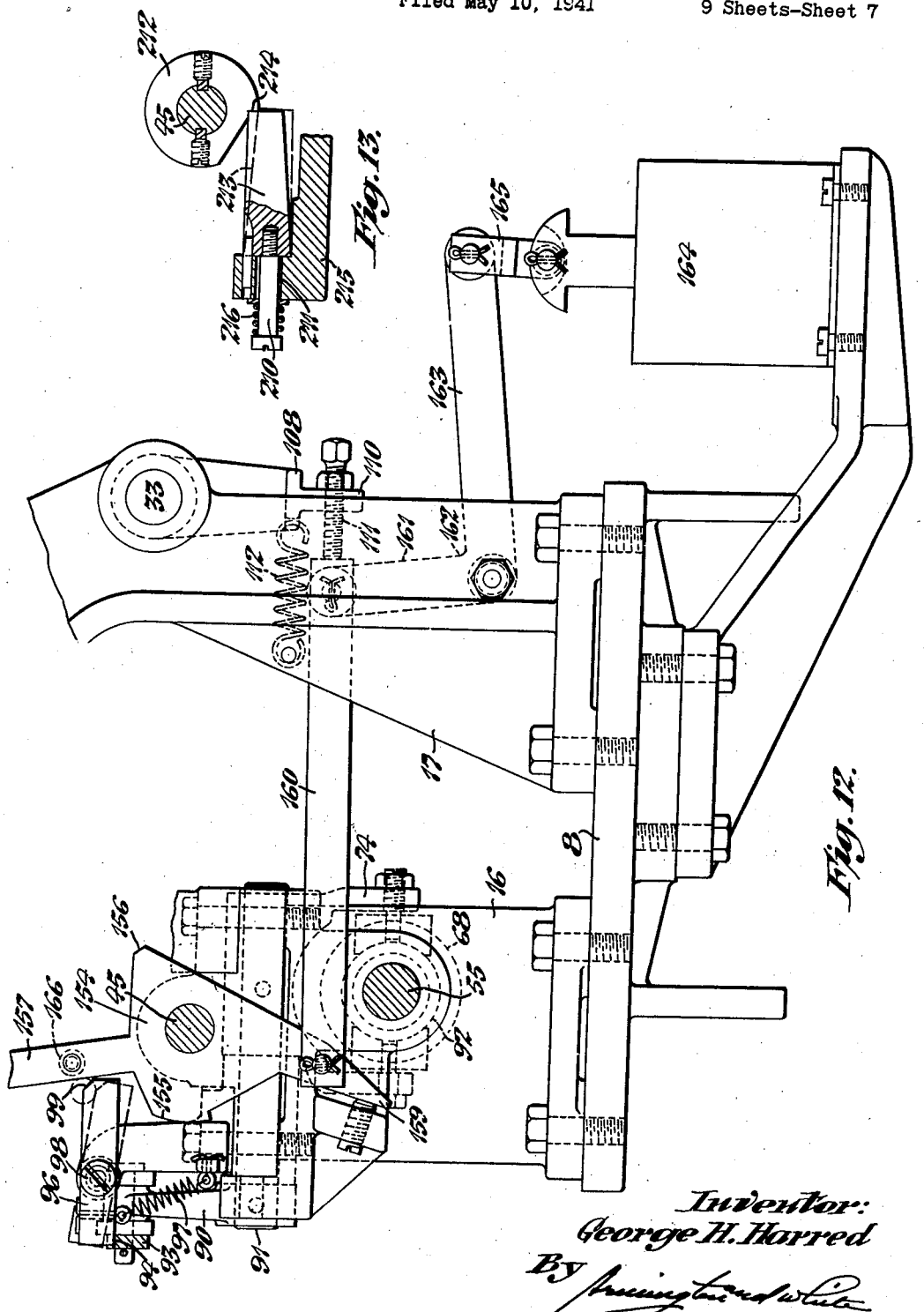
Inventor:
George H. Harred
By Pennington White
Attorneys.

Dec. 15, 1942.　　　　　G. H. HARRED　　　　　2,305,418
WIRE STITCHING MACHINE
Filed May 10, 1941　　　　　9 Sheets-Sheet 8

Inventor:
George H. Harred
By Fleming & White
Attorneys.

Dec. 15, 1942.   G. H. HARRED   2,305,418
WIRE STITCHING MACHINE
Filed May 10, 1941   9 Sheets-Sheet 9

Inventor:
George H. Harred
By Pennington White
Attorneys.

Patented Dec. 15, 1942

2,305,418

UNITED STATES PATENT OFFICE 2,305,418

WIRE-STITCHING MACHINE

George H. Harred, East Greenwich, R. I., assignor to Boston Wire Stitcher Company, Portland, Maine, a corporation of Maine Application May 10, 1941, Serial No. 392,928

29 Claims. (Cl. 1—11)

The present invention relates to wire-stitching machines for stitching the seams of boxes and cartons and more particularly to improvements in wire-stitching machines of the type illustrated and described in my copending application issued into United States Letters Patent No. 2,266,550, dated December 16, 1941.

One of the objects of the present invention is to provide a machine of the type indicated with work-feeding means adapted to be alternately driven by a continuously-operating driving means or an intermittently-operating driving means.

Another object is to provide a machine of the type indicated in which the continuously-operating driving means is disconnected from the work-feeding means and the wire-stitching means connected to its driving means by individual electromagnet-actuated operating means.

Another object is to provide a machine of the type indicated in which the electromagnets are energized in timed sequence to permit the feeding of the work to be arrested before the beginning of a stitching operation.

Another object is to provide a machine of the type indicated in which the switches for controlling the electromagnets are actuated by a freely movable work-operated gauge whereby to prevent jamming or scuffing of the cartons to be stitched.

Another object is to provide a machine of the type indicated having an electromagnet-actuated starting means controlled by the insertion of the work and an electromagnet-actuated stopping means controlled by the operation of the wire-stitching means.

Another object is to provide a machine of the type indicated in which the means for controlling the energization of the electromagnet of the stopping means is adjustable to adapt a stitching operation to be arrested after any predetermined number of stitches have been applied.

Another object is to provide a machine of the type indicated in which the control means is released by the actuation of the stopping means and automatically returned to initial position.

Another object is to provide a machine of the type indicated in which the return of the control means to initial position operates to deenergize the electromagnet of the stopping means.

Another object is to provide a machine of the type indicated having tie-stitch control means for decreasing the increment of movement of the work by the work-feeding means between the first two stitches and last two stitches of a row.

Another object is to provide a machine of the type indicated with tie-stitch control means of simplified construction which are adjustable to adapt them to be operated after any predetermined number of stitches have been applied.

Further objects of the invention are set forth in the following specification which describes a preferred form of construction of the machine, by way of example, as illustrated by the accompanying drawings. In the drawings:

Fig. 1 is a front elevational view of a wire-stitching machine incorporating the novel features of the present invention;

Fig. 2 is an enlarged front elevational view of the right-hand end of the machine, as viewed in Fig. 1, showing the intermittently-operating driving means and the clutch for connecting it to the work-feeding means;

Fig. 3 is an enlarged front elevational view of the left-hand end of the machine, as viewed in Fig. 1, showing the clutch for connecting the continuously-operating driving means to the work-feeding means;

Fig. 4 is a longitudinal sectional view of the clutch illustrated in Fig. 3;

Fig. 5 is a transverse sectional view taken on line 5—5 of Fig. 3 showing the clutch shifting fork;

Fig. 6 is an elevational view partly in section of the left-hand end of the machine, as viewed in Fig. 1, showing the work-feeding means for advancing the work and the continuously-operating driving means therefor;

Fig. 7 is a detailed view of the continuously-operating drive shaft as viewed in the direction indicated by the arrow 7 in Fig. 6;

Fig. 12 is a transverse sectional view taken on line 12—12 of Fig. 2 showing the electromagnet-operated means for actuating the stopping means and releasing the control means and clutch-operating means;

Fig. 13 is a sectional view taken on line 13—13 of Fig. 2 showing the stop for arresting the operation of the control means at the end of its return movement to initial position;

Figures 8, 9:
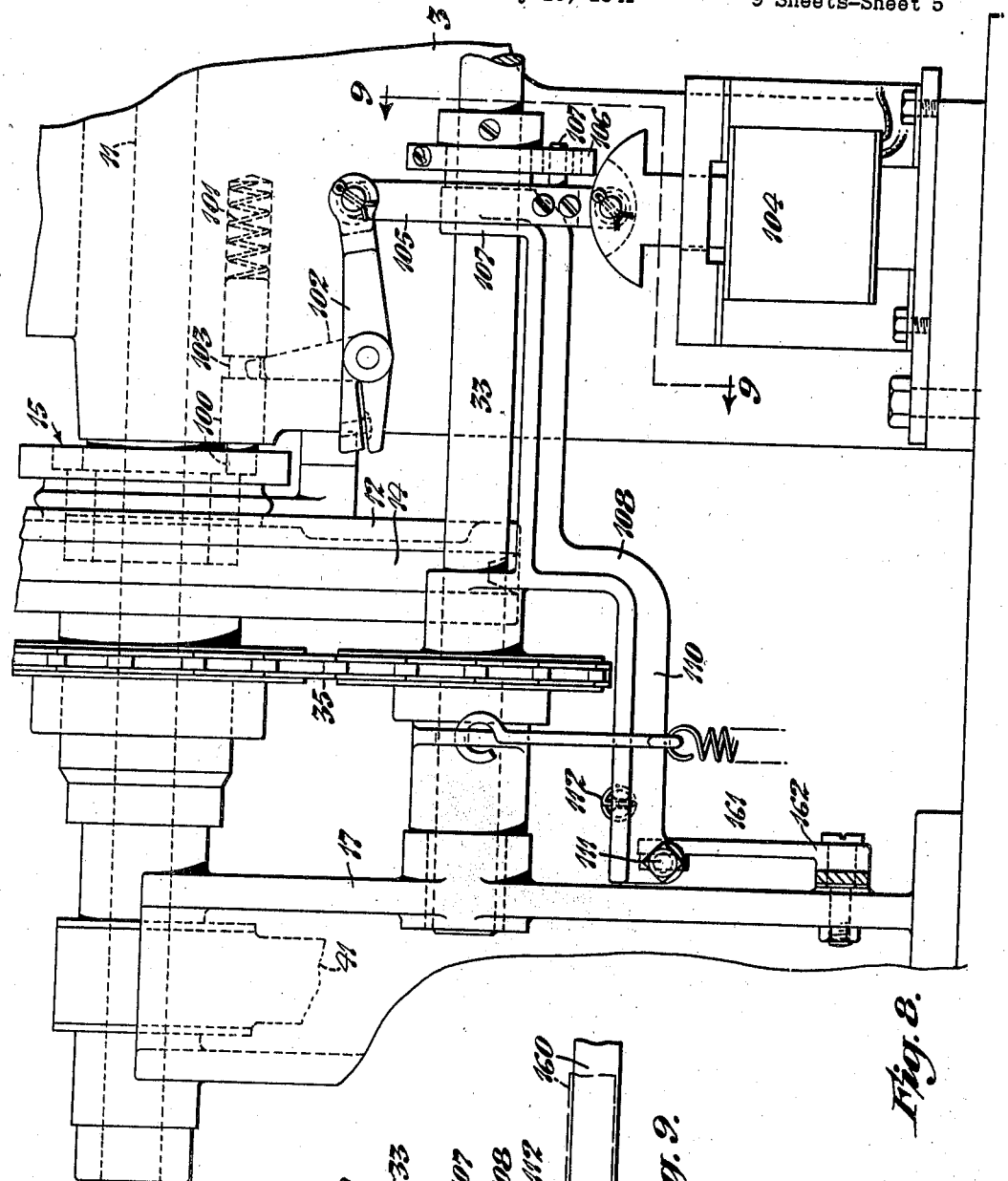
Fig. 8 is a rear elevational view of a part of the machine showing the electromagnet-actuated means for operating the clutch to connect the wire-stitching means to the prime mover.
Fig. 9 is a transverse sectional view taken on line 9—9 of Fig. 8 showing the means for latching the clutch-operating means during a stitching operation.

It has heretofore been proposed to provide wire-stitching machines with work-feeding means alternately driven by separate continuously-operating or intermittently-operating driving means as illustrated in the French patent to Leib, No. 823,051, issued October 4, 1937. In such prior machines, however, the carton is advanced at a high rate of speed by the continuously-operating driving means into engagement with a movable gauge directly connected to operate the clutch for coupling the prime mover to the wire-stitching means. The movement of the gauge in such a construction is opposed by the tension of springs, the inertia of connecting linkages and the frictional resistance of clutch-latching means. As a result of the advancement of the carton by the feeding means against the resistance of the gauge the forward end of the carton is liable to be jammed and crushed and the sides of the carton engaged by the feeding means will be scuffed and abraded. Also, in such prior art machines the continuously-operating driving means is arranged to be disconnected from the work-feeding means by a cam on the drive shaft for the wire-stitching means so that the work-feeding means remains coupled to the continuously-operating driving means to feed the work after the wire-stitching means is coupled to its drive shaft. The carton will therefore continue to advance due to the momentum of the feeding means after the continuously-operating driving means is disconnected from the work-feeding means so that accurate positioning of the work at the beginning of a stitching operation cannot be obtained.

*General organization*

In accordance with the present invention a prime mover, which may take the form of any suitable driving means, operates continuously and through suitable connections drives the work-feeding means. The work-feeding means when driven from the prime mover advances a carton into the machine and carries it against a freely movable gauge which offers negligible resistance to the movement of the carton so that no jamming or scuffing of the carton can occur. The first movement of the gauge operates a switch in an electric circuit to energize an electro-magnet which, through suitable operating means, instantaneously actuates one clutch to disconnect the work-feeding means from the continuously-operating prime mover and another clutch to connect the work-feeding means to an intermittently-operating driving means driven from the wire-stitching means. After the operation of the clutches by the electromagnet a latch engages a linkage connecting the two clutches to retain one disconnected and the other connected.

Upon operation of the clutches the movement of the work-feeding means is rapidly decelerated, due to the inertia of the intermittently-operating driving means. The work and work-gauge, however, continue to advance slightly due to momentum and just before the carton comes to rest the gauge operates a second switch which energizes an electromagnet connected to operate a clutch for coupling the wire-stitching means to the prime mover. The switch-operators on the gauge are adjustable, one with respect to the other, to provide the proper time interval between the disconnection of the continuously-operating driving means from the work-feeding means and the connection of the wire-stitching means with the prime mover to cause the feeding of the work to be arrested before a wire-stitching operation is started whereby to properly position the work to be stitched.

When connected with the prime mover the wire-stitching means and the work-feeding means driven intermittently therefrom operate in timed relation to alternately apply stitches and advance the work to stitch the seam of the carton. Operation of the wire-stitching means also operates a control means with a step-by-step movement until an arm projecting from a control dial thereon comes into position to actuate a switch operator which, in turn, closes a switch to energize the electromagnet in circuit therewith. The last-named electromagnet is connected to operate a stopping means for arresting the operation of the wire-stitching means and to simultaneously release the control means and clutch-latch. Upon release of the clutch-latch the clutches are operated simultaneously by a spring to disconnect the intermittently-operating driving means for the work-feeding means and connect the continuously-operating driving means thereto to discharge the stitched carton from the machine at a high rate of speed. Upon release of the control means a clock-spring operates to return the same to its initial position. At the end of the return movement of the control means an arm thereon actuates the switch-operator to release the switch and deenergize the electromagnet for actuating the stopping means. The arms on the control means are relatively adjustable whereby to adapt them to actuate the switch-operator after any predetermined number of stitches have been applied.

A tie-stitch control means is also provided which is operative to decrease the increment of movement of the work by the work-feeding means to apply certain stitches closely adjacent each other, preferably at the beginning and end of a row of stitches. In accordance with the present invention the tie-stitch control means is operated by a pair of cams to regulate the spacing between the first two stitches and the last two stitches of a series; the cams being relatively adjustable to adapt the tie-stitch means to be operated after any predetermined number of stitches have been applied.

*Wire-stitching means and drive therefor*

The wire-stitching machine to which the improvements of the present invention are applied is generally similar to that illustrated and described in my United States Letters Patent No. 2,266,550, referred to above. Suffice it to state herein that the machine comprises a frame having a pedestal 2 with a horizontally extending arm 3 at its upper end, see Fig. 1. Below the arm 3 is a work-supporting table 4 mounted by means of brackets 5 and 6 on an I-beam 6 projecting laterally from the pedestal 2, the outer end of the I-beam being supported by a post 7. Projecting laterally from the pedestal 2 at the side opposite from the table 4 is a platform or shelf 8. Mounted on the platform 8 are four bearing brackets 9, 16, 17 and 59 in which the rotating parts of the machine are journaled, see Fig. 1.

A wire-stitching head 10 is mounted at the end of the horizontally-extending arm 3 for operation by a drive shaft 11 extending through the arm and projecting beyond the pedestal. The wire-stitching head 10 may be of any suitable construction and, as herein illustrated, is of the type shown and described in United States Letters Patent to H. G. Allen, No. 1,760,031, issued May 27, 1930. In the operation of this type of machine, during the first half revolution of the drive shaft 11 a length of wire is cut from the supply, bent into a U-shaped staple, driven into the work and clinched on the under side thereof; and during the second half revolution of the drive shaft 11 the parts of the stitching mechanism are returned to initial position and another length of wire is fed into the head. A fly-wheel 12 is mounted for rotation on the extended end of the drive shaft 11 and is continuously driven by a belt 14 from a suitable prime mover, herein illustrated as an electric motor 13. A clutch 15 is provided adjacent the fly-wheel 12 for connecting the latter to the drive shaft 11. Depending from the head is a flap-guide and clincher anvil of the same construction as illustrated and described in my prior patent referred to above.

*Work-feeding means and drive therefor*

The work in the form of a carton blank W, shown in section in Fig. 6, is fed either continuously or intermittently in timed relation to the wire-stitching mechanism by means of spaced pairs of cooperating feed rolls 18 and 19, see Fig. 1. The upper feed rolls 18 are mounted on a shaft 20 journaled in suitable bearings depending from the arm 3 and head 10. The lower cooperating feed rolls 19 act merely to press the work against the upper feed rolls 18, being mounted on a shaft 21 journaled in bearing blocks 22, see Figs. 1 and 6, which are mounted in pivoted rocker-arms 36 in the manner illustrated and described in my prior patent. The rocker-arms 36 are pinned to a shaft 37 journaled in suitable bearing brackets on the I-beam 6, see Figs. 1 and 6. Depending from the shaft 37 is an arm held against an adjustable abutment or stud 38 by means of a spring 39. By adjusting the abutment 38 the position of the rolls 19 may be altered in accordance with the thickness of the work to maintain it against the driven rolls 18 with the proper pressure.

The end of the shaft 20 projects beyond the bearing depending from the head 10 and is rotatably connected to the end of a shaft 23, see Fig. 4, in axial alinement therewith, the shaft 23 being journaled in a bearing 24 depending from a bracket 84 attached to the arm 3. The shaft 23 is adapted to be driven by continuously-operating driving means connected to the prime mover 13. To this end a pulley 25 having belt grooves 26 in its periphery and clutch-teeth 27 on one face, see Figs. 3 and 4, is mounted to rotate freely on the projecting end of the shaft 20. The clutch-teeth 27 on the pulley 25 are adapted to engage with clutch-teeth 28 on a clutch-member 29 splined to the shaft 23. A spring 30 acting between a collar 31 fast on the shaft 23 and the clutch-member 29 normally operates the latter to engage its teeth 28 with the teeth 27 of the pulley 25. The pulley 25 is driven from a pulley 32 fast on a shaft 33 at the rear of the machine by means of belts 34, see Figs. 4, 6 and 7. The shaft 33 is journaled in suitable bearings in the head 10 and bearing bracket 17 and is driven from the fly-wheel 12 by means of a chain 35, see Figs. 2, 8 and 10. Thus, the fly-wheel 12 will operate through the chain 35, shaft 33, pulley 32, belt 34, pulley 25 and the clutch-member 29 to drive the feed rolls 18 and advance the work between the spaced pairs of feed rolls 18 and 19 with a continuous movement.

Figure 10:
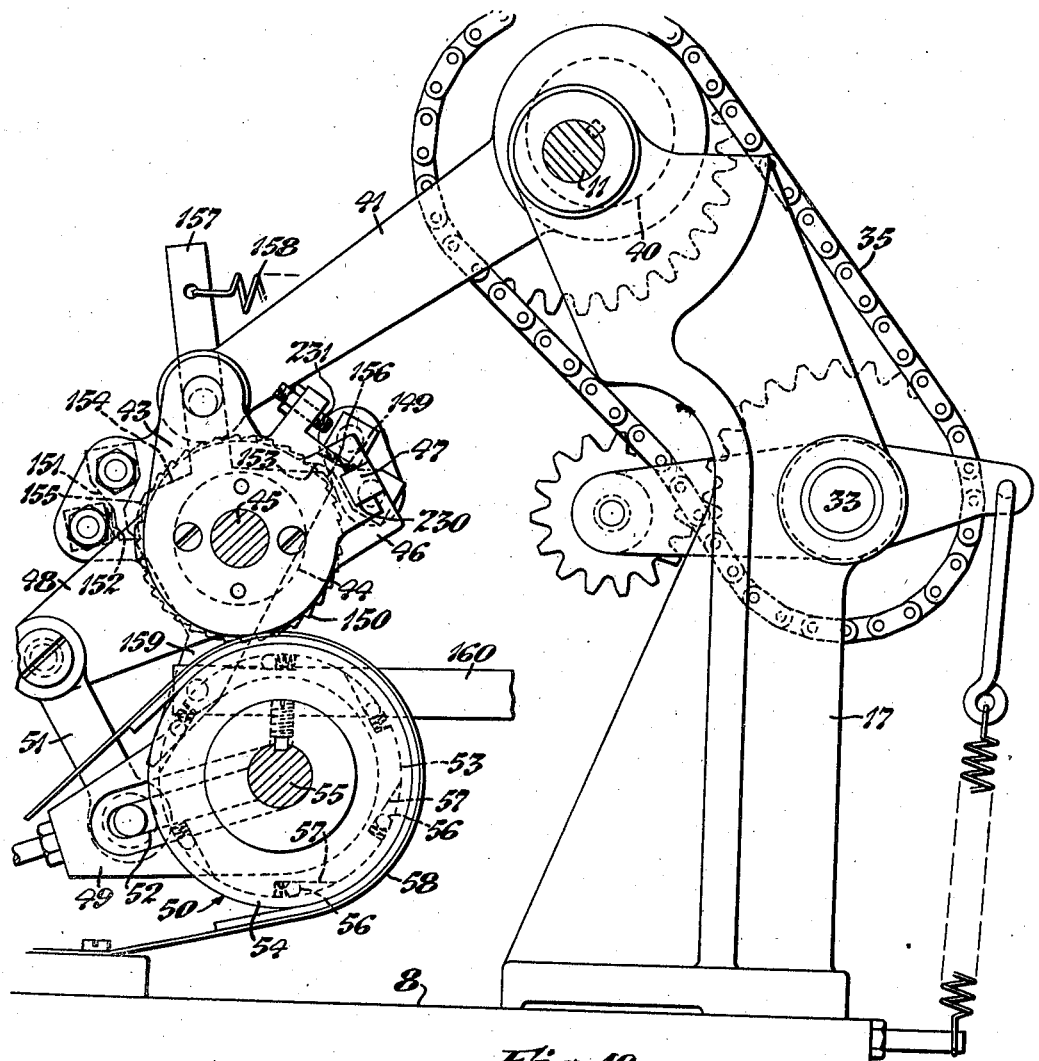
Fig. 10 is a transverse sectional view taken on line 10—10 of Fig. 2 showing the intermittently-operating means for driving the work-feeding means and the control means.

The shaft 20 is also adapted to be driven with an intermittent motion when the teeth 28 of the clutch-member 29 are disengaged from the teeth 27 on the pulley 25. The intermittently-operating driving means receives motion from the drive shaft 11 for the wire-stitching head 10 through connections comprising an eccentric 40 on the shaft 11 which actuates a pitman 41, see Figs. 2 and 10. The opposite end of the pitman 41 is pivotally connected to the spaced crank-arms 42 and 43 of an oscillating member 44 rockably mounted on a control shaft 45. A second oscillating member 46 mounted on the hub of the oscillating member 44 between the crank-arms 42 and 43 is connected for movement therewith by a rockable key 47, see Fig. 19. A crank-arm 48 projecting from the oscillating member 46 is connected to the crank-arm 49 of a one-way clutch 50 by means of a link 51. As illustrated in Fig. 10, the crank-arm 49 has a radial slot 52 which provides for adjustment of its operative stroke whereby to vary the spacing between stitches. The crank-arm 49 is integral with a central hub-member 53 which oscillates in a housing member 54 fast on a shaft 55. Rollers 56 in wedge-shaped recesses 57 in the oscillating hub 53 permit relative movement of the latter with respect to the housing 54 in a counterclockwise direction as viewed in Fig. 10; the rollers engaging frictionally with the rim of the housing 54 to connect the parts for movement as a unit when the hub is moved in a clockwise direction. A brake-band 58 is preferably provided surrounding the housing 54 to prevent uncontrolled movement thereof.

The shaft 55 is journaled for rotation in the bearing brackets 16 and 59 supported on the shelf or platform 8 and has a clutch-member 68 splined thereto at its inner end. In alinement with the shaft 55 is a shaft 60 journaled in bearings in the bracket 9 and having a spur gear 64 pinned thereto. The spur gear 64 has a laterally-projecting hub 65 with clutch-teeth 66 on its end face adapted to cooperate with clutch-teeth 67 on the clutch-member 68. When the teeth 67 of the clutch member 68 are engaged with the clutch-teeth 66 on the hub 65 of the gear 64 the latter will be rotated from the shaft 55. The gear 64 meshes with a spur gear 69 on the end of a shaft 70 which is journaled in spaced bearings 71 in the bracket 9 and connected to the shaft 23, see Figs. 3 and 4, by means of a universal coupling 72.

Clutch-operating means for the work-feeding means

The clutch-member 29 is disconnected from the pulley 25 and the clutch-member 68 engaged with the hub 65 of the gear 64 simultaneously by electromagnet-actuated operating means controlled by the position of the work. Referring to Fig. 1, an electromagnet 75 is connected by a link 76 to one end of a lever 77 pivotally mounted intermediate its ends on a stud 78 projecting from the bearing bracket 84. The opposite end of the lever 77 is connected by a link 79 to one arm 80 of a bell-crank lever 81 secured fast to a shaft 82 journaled in a bearing 83 in the bracket 84, see Fig. 5. A clutch-shifting element 85 fast on the end of the shaft 82 projects beyond the bearing 83 and has a fork 86 carrying pins and shoes projecting into a peripheral groove 87 in the clutch-member 29 at opposite sides thereof.

A connecting rod 88 has a clevis at one end connected to the depending arm 89 of the bell-crank-lever 81 and an adjustable clevis at its opposite end connected to one end of a lever 90, see Fig. 1. The lever 90 is fast on one end of a pivot stud 91 mounted in the bearing bracket 16 and on the opposite end of the stud is a shifting fork 74 carrying pins and shoes engageable in a groove 92 in the clutch-element 68, see Figs. 2 and 12. The bell-crank-lever 81 is rocked by the electromagnet 75 when the latter is energized as it acts through the link 76, lever 77 and link 79 to operate the clutch-shifting element 85 against the action of the spring 30 whereby to disconnect the continuously-operating driving means from the work-feeding means. The bell-crank-lever 81 transmits motion through the arm 89, connecting rod 88 and lever 90 to shift the clutch-element 68 into engagement with the hub 65 of the gear 64 to connect the intermittently-operating driving means to the work-feeding means.

Attached to the side of the clevis at the end of the connecting rod 88 is a bar 93 which projects beyond the lever 90 and has a slot 94 therein to provide a latching-shoulder 95. Upon movement of the connecting rod 88 and bar 93 to the right, as viewed in Fig. 2, a pivoted latching-member 96, see Figs. 2 and 12, is actuated by a spring 97 to cause its end to enter the slot 94 in the bar 93 and engage the latching-shoulder 95. As illustrated in Fig. 12, the latching-member 96 is pivoted intermediate its ends on a stud 98 and has a beveled cam-face 99 at its rearward end. Engagement of the pivoted latching-member 96 with the latching-shoulder 95 of the bar 93 acts to hold the clutch-member 29 disconnected from the pulley 25 and the clutch-member 68 engaged with the hub 65 of the gear 64.

Starting means

The stitching operation is started by connecting the fly-wheel 12 to the drive shaft 11 for the stitcher head 10 by means of the clutch 15. The clutch 15 is substantially of the type illustrated and described in United States Letters Patent to A. H. Maynard, No. 1,495,342, issued May 27, 1924. Suffice it to state herein that the clutch is normally held inoperative or disconnected by a pin 100, see Fig. 8, projected into the clutch by the spring 101 and is operative to couple the fly-wheel to the shaft 11 when the pin is withdrawn against the action of the spring. The pin 100 is withdrawn against the action of the spring 101 by means of a double bell-crank-lever 102 having one arm projecting into a peripheral groove 103 in the pin and another arm projecting at right-angles thereto. The bell-crank-lever 102 is arranged to be actuated by an electromagnet 104 connected thereto by link 105. When the electromagnet 104 is energized it operates through the link 105 and bell-crank-lever 102 to withdraw the pin 100 against the action of the spring 101 to couple the fly-wheel 12 to the drive shaft 11.

Upon energization of the electromagnet 104 and withdrawal of the pin 100 a latching-element 106 operates automatically to engage a pin 107 carried by the link 105 to retain the clutch control pin 100 retracted, see Figs. 8 and 9. The latching-element 106 is clamped to one of the bearing hubs 107 of a frame 108 rockably mounted on the continuously-operating shaft 33 for driving the work-feeding rolls 18. The latching-element 106 has an offset latch-shoulder 109 and upon energization of the electromagnet 104 the pin 107 carried by the link 105 moves from the position illustrated in full lines in Fig. 9 to that indicated by dash lines. Then as the frame 108 carrying the latching-element 106 is rocked by a spring 112 from the position illustrated in full lines in Fig. 9 to that indicated by dash lines its latching-shoulder 109 is engaged with the pin 107 on the link 105. The frame 108 has a laterally projecting arm 110 carrying an adjustable abutment 111 at its end, the adjustable abutment being illustrated in the form of a set-screw. The adjustable abutment 111 is adapted to be engaged by stopping means, to be described later, to rock the frame 108 from the position indicated by dash lines in Fig. 9 to that illustrated in full lines to release the pin 107. Upon release of the pin 107 from the latching-element 106 the spring 101 acts to project the pin 100 into the clutch 15 to uncouple the fly-wheel 12 from the drive-shaft 12 and rock the bell-crank-lever 102 to the position illustrated in Fig. 8.

Work-operated gauge

Figure 20:
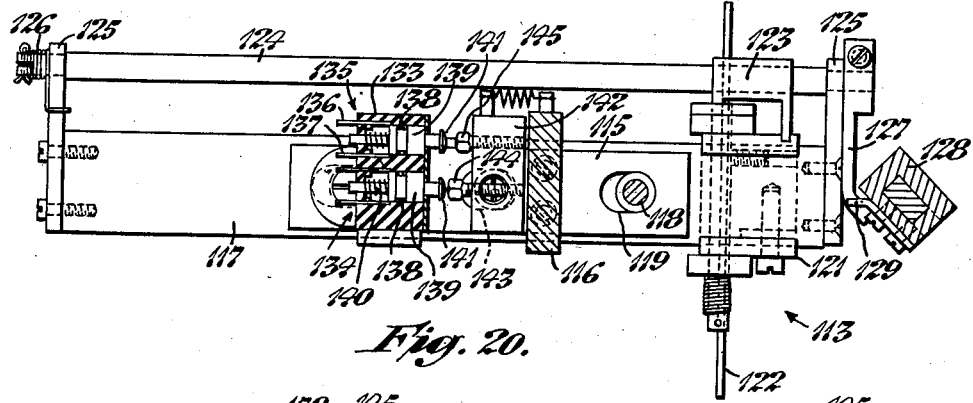
Fig. 20 is a plan view of the work-operated gauge showing the pair of switches and the longitudinally spaced relationship of the switch-operating means.
Figure 21:
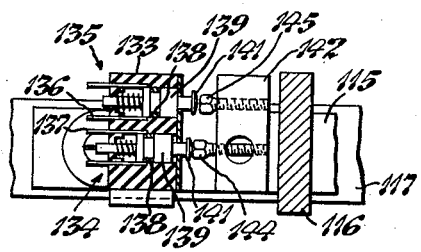
Fig. 21 is a view similar to Fig. 20 showing one of the switches operated to energize the electromagnet for disconnecting the continuously-operating drive and connecting the intermittently-operating drive to the work-feeding means.

The energization of the electromagnets 75 and 104 is controlled by a work-operated gauge 113, see Fig. 6. The work-operated gauge 113 is illustrated in detail in Figs. 20 to 23 and is generally similar to the gauge illustrated and described in my prior patent, referred to above. Suffice it to state herein that the gauge 113 comprises an upper stationary plate 115 supported from an arm 116 depending from the frame of the stitcher head 10, see Figs. 20 and 23. Slidably mounted on the under side of the stationary plate 115 is a plate 117 having studs 118 projecting through elongated slots 119 in the stationary plate with washers 120 overlying the top face of the latter under the heads of the studs. A block 121 mounted on the sliding plate 117 is adapted to be clamped in different positions of adjustment along the length of the plate. A depending bifurcated gate 122 having spaced bearing portions pivoted to opposite sides of the block 121 is adapted to be engaged by the work, that is, the end of the carton blank W, indicated by dash lines in Fig. 23.

Figure 23:
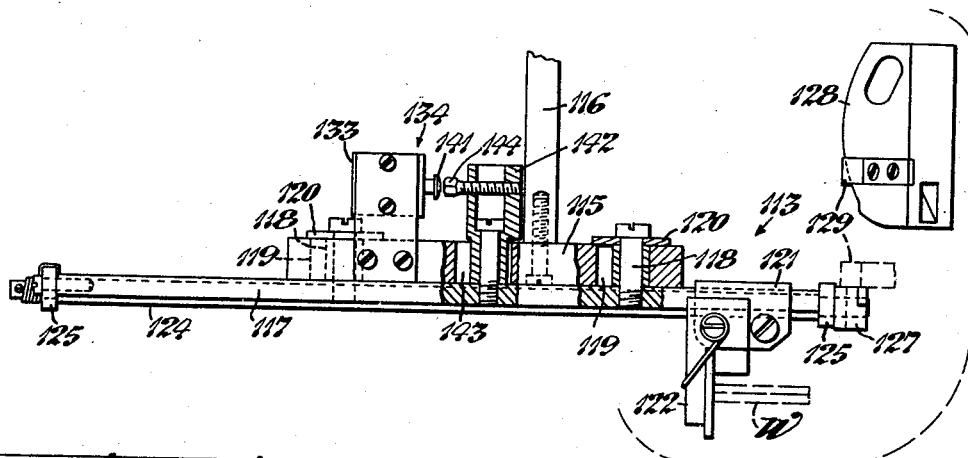
Fig. 23 is a part sectional side elevational view of the work-operated gauge showing the relatively movable parts for operating the switches.

The gate 122 is held in its vertical position illustrated in Fig. 23 by means of a latch 123 mounted on a square shaft 124, the latter having bearings at its ends rotatably mounted in arms 125 carried at the ends of the sliding plate 117. A spring 126 acting between one of the arms 125 and one end of the square shaft 124 normally tends to rock the latter to engage the latch 123 with one bearing portion of the gate 122 to hold it in its vertical position. An arm 127 at the opposite end of the square shaft 124 underlies a reciprocating part 128 of the stitcher head 10 and is engaged by a finger 129 thereon during the applying of a stitch S to the work. Rocking movement of the arm 127 rocks the square shaft 124 and latch 123 to release the gate 122 whereby it can swing to permit the work to pass thereunder. As thus far described the work-operated gauge is substantially identical with that illustrated and described in my prior application referred to above.

Fastened to the fixed plate 115 is a switch-block 133 mounting two separate switches 134 and 135. The switches 134 and 135 may be of any suitable type and, as herein illustrated, each switch comprises a pair of spaced contacts 136 and 137 adapted to be bridged by a metallic ring 138 carried by a plunger 139. A spring 140 acting between the block 133 and the plunger 139 tends to move the plunger to disengage the metallic bridging element from engagement with the spaced contacts 136 and 137. Projecting forwardly from the plunger 139 of each switch is a contact element 141.

The operator for the switches 134 and 135 comprises a post 142 fixedly mounted on the sliding plate 117 and projecting upwardly through an elongate slot 143 in the fixed plate 115. The post 142 carries adjustable abutments 144 and 145 engageable with the contact elements 141 of the switches. As herein illustrated the adjustable abutments 144 and 145 are in the form of set-screws screwed into the post 142. In accordance with the present invention the adjustable abutment 144 is positioned forwardly of the adjustable abutment 145 to adapt it to engage and operate the plunger 139 of the switch 134 prior to the engagement of the abutment 145 with the plunger of the switch 135.

Figure 24:
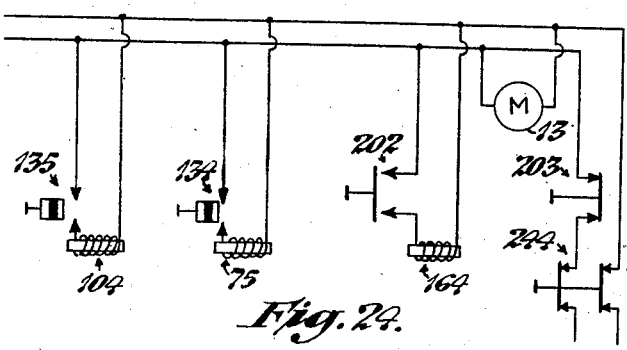
Fig. 24 is a diagrammatic view of the electric circuits for the electromagnets.

By reference to the electrical circuit illustrated in Fig. 24, it will be noted that the switch 134 controls the energization of the electromagnet 75 for operating the clutches 29 and 68 to uncouple the continuously-operating driving means from the work-feeding means and couple the intermittently-operating driving means thereto. The switch 135 controls the energization of the electromagnet 104 for withdrawing the pin 100 from the clutch 15, see Fig. 8, to couple the flywheel 12 to the drive shaft 11. It will be observed that the movable plate 117 of the work operated gauge 113 will offer very little resistance to the movement of the work W whereby to avoid jamming of the work against the depending gate 122 or scuffing of the work by the rotation of the feed rolls 18. It will also be observed that the switch 134 is closed prior to the switch 135 to provide a time interval between the feeding of the work by the continuously-operating driving means and the operation of the stitching means 10 to permit the work to come to a stop prior to the commencement of the stitching operation.

*Control means*

The stopping of the stitching operation is governed by the control shaft 45, previously referred to, which is operated in timed relation to the wire-stitching means. The control shaft 45 is mounted for rotation in the bearing brackets 16 and 59 supported on the platform 8 of the machine frame, see Fig. 2. Mounted on the inner end of the control shaft 45 is a ratchet-wheel 150 positioned closely adjacent the crank-arm 42 of the oscillating member 44. Mounted on the side of the crank-arm 42 of the oscillating member 44 is a pawl 151, see Fig. 10, which overlies the teeth on the ratchet-wheel 150 and is yieldingly engaged therewith by means of a spring 152. A check-pawl 153 rockably mounted on the bearing bracket 16 is engaged with the teeth of the ratchet-wheel by a spring 149 to hold the ratchet-wheel between strokes of the pawl 151. As the crank-arm 42 of the oscillating member 44 is reciprocated by the eccentric 40 and pitman 41 the pawl 151 acts to index the ratchet-wheel 150 ahead through a distance of one tooth.

Rockably mounted on the control shaft 45 adjacent the ratchet-wheel 150 is a release plate 154, see Fig. 10, having cam-lobes 155 and 156 engageable with the pawls 151 and 153 to release them from engagement with the teeth on the ratchet-wheel 150. The lobe 155 of the release plate 154 also acts as a support on which the pawl 151 slides during part of its operative stroke to limit the advancement of the ratchet-wheel to one tooth only for each stitch applied. Projecting upwardly from the release plate 154 is an arm 157 connected to a spring 158 for rocking the release plate in clockwise direction, as viewed in Fig. 10, to disengage the lobes 155 and 156 from the pawls 151 and 153. A laterally-projecting pin 166 is also provided on the arm 157 for engagement with the beveled cam-face 99, previously described, on the latch-member 96, see Fig. 12, to release it from the shoulder 95 of the slide bar 93, see Fig. 2. Depending from the release plate 154 is an arm 159 connected to one end of a link 160.

The opposite end of the link 160, see Fig. 12, is connected to the upright arm 161 of a bell-crank-lever 162 and the rearward end of the link constitutes a bunter for engagement with the adjustable abutment 111 of the rockable frame 108 of the stopping mechanism. The opposite lateral arm 163 of the bell-crank-lever 162 is connected to the plunger of an electromagnet 164 by means of a link 165. Thus, upon energization of the electromagnet 164 the frame 108 of the stopping mechanism is rocked to release the latching element 106 from engagement with the pin 107 on the link 105, see Fig. 8, whereby the spring 101 projects the plunger 100 into the clutch 15 to uncouple the fly-wheel 12 from the drive shaft 11 and simultaneously rocks the release plate 154 to release the pawls 151 and 153 from engagement with the teeth on the ratchet-wheel 150.

Figures 14, 15:
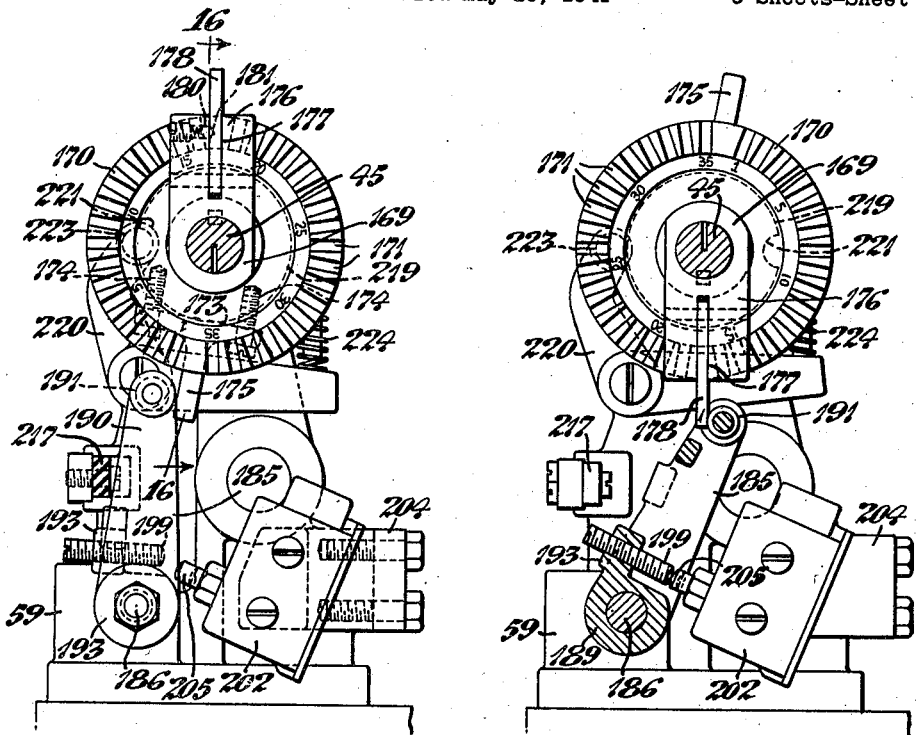
Fig. 14 is an elevational view of the right-hand end of the machine, as viewed in Fig. 1, showing the relationship of the parts with the control dial in its initial position.
Fig. 15 is a view similar to Fig. 14 showing the switch-operator actuated by the adjustable arm on the control dial for operating the stopping means.
Figure 16:
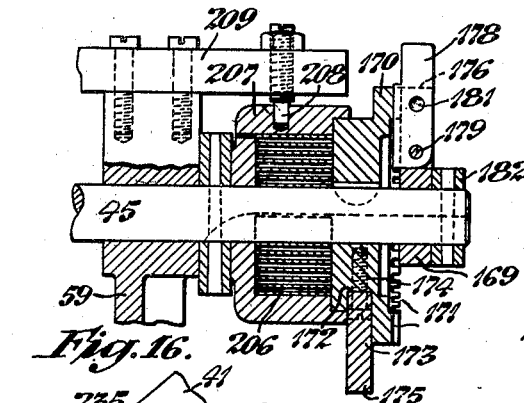
Fig. 16 is a transverse sectional view taken on line 16—16 of Fig. 14 showing the spring for returning the control means to initial position.

Keyed to the outer end of the control shaft 45 is a dial 170, see Figs. 14 to 16, having an offset rim provided with a series of radial slots 171. In accordance with the present invention there is a slot 171 for each tooth on the ratchet-wheel 150 whereby the rotation of the control shaft 45 a distance of one tooth by the oscillating member 44 will rotate the disk 170 a corresponding angular distance. As the present machine is adapted to apply any number of stitches from one to thirty-six, there are thirty-five radial slots 171 with the slots indicated by suitable index numbers. The dial 170 has a chordal slot 172 in its periphery for mounting a T-shaped bracket 173 by means of screws 174, the bracket having an arm 175 projecting radially beyond the periphery of the disk between the first and thirty-fifth slots 171. Freely mounted for rotation on the outer end of the control shaft 45 is a hub 169 having a radially-extending flange 176 with a centrally disposed radial slot 177. An arm 178 positioned in the slot 177 is pivotally mounted for rocking movement on a pin 179 extending across the slot. The arm 178 is adapted to be rocked on the pin 179 into engagement with any one of the radial slots 171 in the disk 170 and is of such length as to adapt its end to project beyond the periphery of the dial. The arm 178 is retained in the appropriate slot into which it has been entered manually by means of a spring-pressed detent 180. The detent 180 may be in the form of a hardened ball, see Fig. 14, slidable in a boss in the flange 176 and engageable with a recess 181 in the arm 178. The hub 169 is retained axially in position on the shaft 45 by means of a collar 182 pinned to the outer end of the shaft.

The ends of the arms 175 and 178 are adapted to engage and actuate a switch-operating frame 185 rockably mounted on a stud 186, see Figs. 2, 14 and 15. The stud 186 is bolted to the foot of the bearing bracket 59 and has an annular flange 188. The rockable frame 185 has a hub 189 rockably mounted on the reduced projecting end of the stud 186 and spaced radial arms 190 connected at their upper ends by a cross-pin 191. Between the hub 189 of the rockable frame 185 and the radial flange 188 of the stud 186 is a friction washer 192 and abutting the opposite end of the hub 189 is a washer 193. The washer 193 is yieldingly forced against the end of the hub 189 and the opposite end of the hub is forced against the washer 192 by means of a spring 194 acting between the washer 193 and nut 195 on the reduced end of the stud 186. Thus, the rockable frame 185 is adapted to be frictionally held in any position to which it is rocked. Mounted in a boss 198 on the hub 189 of the rockable frame 185 between the arms 190 is an adjustable abutment 199 herein illustrated in the form of a set-screw, see Fig. 15. Projecting laterally from the inside arm 190 of the rockable frame 185 is a finger 200 mounting an adjustable abutment 201 similar to the abutment 199.

Adjacent the rockable frame 185 is a pair of electrical switches 202 and 203 located in position to be engaged by the abutment 199 and 201, respectively. The switches 202 and 203 may be of any suitable construction but, as herein illustrated, are of the push-button type and mounted on a suitable bracket 204 projecting from the bearing bracket 59 supported on the platform 8. The switch 202 is electrically connected to the electromagnet 164 and the switch 203 is connected at one side of the power supply line to open the entire circuit upon failure of the switch 202 to operate, see Fig. 24.

Upon energization of the electromagnet 164 and release of the control shaft 45 by the disengagement of the pawls 151 and 153 from the ratchet-wheel 150 a clock-type spring 206 operates on the control shaft to return it to initial position, see Fig. 16. The spring 206 is of identical construction with that illustrated and described in my prior application, referred to above, having one end extending through a slot in the shaft 45 and its opposite end attached to an enclosing housing 207. The housing 207 may be turned with respect to the shaft 45 to tension the spring 206 and then locked in position by a pin 208 depending from a bracket 209 on the bearing frame 59 and engaging one of a series of holes in the housing. Upon return rotation of the control shaft 45 under the operation of the spring 206 the projecting end of the arm 175, moving in a clockwise direction, as viewed in Fig. 15, engages the cross-pin 191 of the rockable frame 185 to rock the latter to the position illustrated in Fig. 14 to release the plunger 205 of the switch 202; the rockable frame 185 having been held in the position illustrated in Fig. 15 by the friction washers 192 and 193 engaging the ends of its hub 189.

To limit the return movement of the control shaft 45 and accurately position the arm 178 at the start of a new stitching operation a stop member 212 is provided on the shaft 45 having means engageable with an abutment 213, see Figs. 2 and 13. As illustrated most clearly in Fig. 13 the stop member 212 is in the form of a collar pinned to the shaft 45 and having a radial shoulder 214. The abutment 213 is in the form of a finger mounted on a stud 210 held in an enlarged hole 211 in a stationary bracket 215 and yieldingly held maintained in the position illustrated in full lines in Fig. 13 by a spring 216 on the stud to adapt its end to engage the shoulder 214 on the stop member 212. The abutment 213 is adapted to rock to the position indicated by dash lines in Fig. 13 against the action of the spring 216 as the stop member 212 rotates during the stitching operation.

Figure 11:
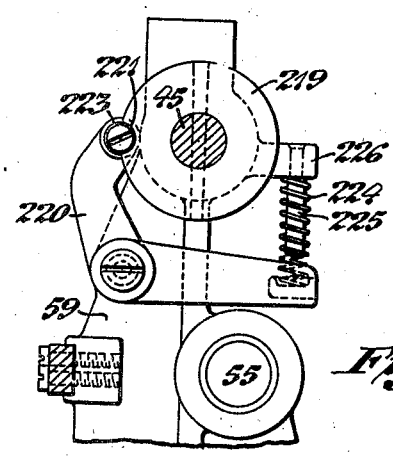
Fig. 11 is a transverse sectional view taken on line 11—11 of Fig. 2 showing the brake means for preventing rebound of the control means when the latter is returned to initial position.

To cushion the action of the rockable frame 185 when rocked by the extended end of the arm 175 a yielding abutment or rubber buffer 217 is provided projecting laterally from the bracket 59 and overlying one of the arms 190 of the frame to adapt it to be engaged thereby, see Figs. 2 and 14. To prevent rebound of the control shaft 45 when it is returned to initial position under the action of the spring 206 a brake-member 219 is provided on the control shaft 45 engageable by a spring-pressed lever 220, see Figs. 2 and 11. The brake-member 219 is in the form of a disk having a semicircular notch or recess 221 in its periphery. The lever 220 is in the form of a bell-crank pivotally mounted on the bracket 59 and having a laterally-projecting pin 223 at one end engageable with the notch 221 in the brake disk 219. The opposite arm of the lever 220 is engaged by a spring 224 mounted on a depending pin 225 held in a lug 226 on the bracket 59 and acting between the lever and the lug to yieldingly rock the lever to engage the pin 223 with the notch 221.

Tire-stitch mechanism

A tie-stitch mechanism is proveded which is operative to reduce the increment of movement of the work between certain stitches to position them closely adjacent each other, and preferably the tie-stitch mechanism functions to effect a tie-stitch at the beginning and at the end of a row of stitches S. The tie-stitch mechanism is generally similar to that illustrated and described in my prior patent, referred to above, but the operating mechanism therefore is of improved and simplified construction. Suffice it to state herein that the tie-stitch mechanism comprises the key 47 pivotally mounted on the oscillating member 46 and engageable with a notch 230 in the oscillating member 44 to connect the two members for movement as a unit, see Figs. 18 and 19. By rocking the key 47 to the position illustrated in Fig. 19 the oscillating member 44 is adapted for relative movement with respect to the oscillating member 46. An adjustable abutment 231 on the flange 43 of the oscillating member 44 then engages the side of the key 47 to rock the oscillating member 46, but with lost-motion whereby to operate the work-feed rolls 18 through a shorter arc of movement and thereby decrease the increment of movement of the work between stitches S. The end of the key 47 overhangs the flange 43 of the oscillating member 44 and overlies an arcuate lever 232. The arcuate lever 232 is pivotally mounted on a pin 233 projecting from the bracket 209, see Figs. 2 and 18, the arcuate lever having a tail-piece 234 engageable with a pin 235 on the bracket to limit its rocking movement in clockwise direction as viewed in Fig. 18. Projecting laterally from the side of the arcuate lever 232 is a lug 236 having its sides beveled or inclined.

Figure 17:
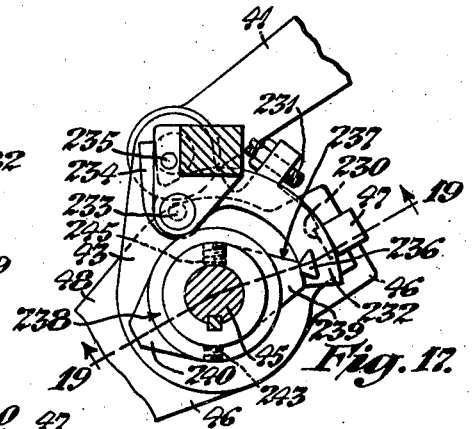
Fig. 17 is a transverse sectional view taken on line 17—17 of Fig. 2 showing the tie-stitch means operated by one of the cams on the control means at the start of a stitching operation.
Figures 18, 19:
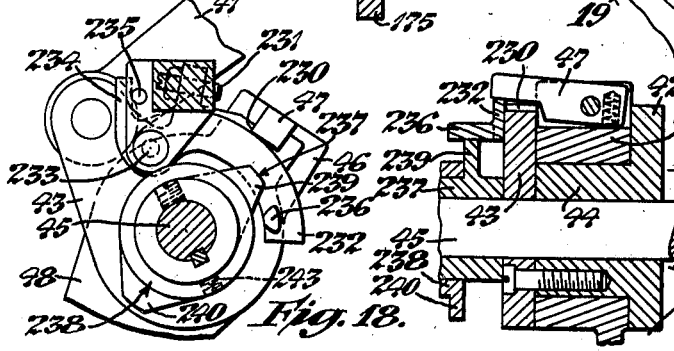
Fig. 18 is a view similar to Fig. 17 showing the tie-stitch means released by the cam after the first stitch has been driven and prior to its operation by the second cam.
Fig. 19 is a sectional view taken on line 19—19 of Fig. 17 showing the tie-stitch key raised by the cam on the control means to disconnect the oscillating members of the intermittently-operating driving means.

The operating mechanism for the tie-stitch means comprises a pair of cams 237 and 238 mounted on the control shaft 45, see Figs. 2, 17 and 18. The cam 237 is in the form of a hub keyed to the shaft 45 and having a lobe 239 projecting radially therefrom, the cam being retained in operative position by a set-screw 245. The cam 238 is in the form of a hub rotatable on the hub of the cam 237 and having a radially-projecting lobe 240. The cam 238 is angularly adjustable with respect to the cam 237 and has an outer beveled end 241, see Fig. 2, marked with a suitable index which cooperates with a set-mark 242 on the hub of the cam 237 to adapt the cams to be set to operate the arcuate lever 232 at the beginning of a stitching operation and after any predetermined number of stitches S have been applied. The cam 238 is locked in adjusted position on the hub of the cam 237 by means of a set-screw 243. The lobes 239 and 240 of the cams 237 and 238 are so arranged as to engage the laterally-projecting lug 236 on the arcuate lever 232 and thereby rock the key 47 to uncouple the oscillating members 44 and 46. Preferably, the cam 237 is fixed in such position on the shaft 45 that the lobe 239 engages the lug 236 when the control shaft is in its initial position, see Fig. 17, and the lobe 240 of the cam 238 will engage the lug 236 during the application of the next to the last stitch S. A preferred embodiment of the invention having now been described in detail the mode of operation of the complete machine is explained as follows:

Mode of operation

At the beginning of a stitching operation the motor 13, energized by closing a power line switch 244, see Fig. 24, drives the fly-wheel 12 by means of the belt 14 and through the chain 35 drives the shaft 33. The clutch-member 29 being engaged with the pulley 25 and the clutch-member 68 being disengaged from the hub 65 of the gear 64, the pulley 32 on the shaft 33 drives the shaft 26 carrying the work-feeding rolls 18. Consequently, the work-feed rolls 18 will be rotated continuously at high speed.

To start the stitching operation a carton W is inserted between the spaced pairs of feed rolls 18 and 19 and is advanced thereby to engage its end with the depending gate 122 of the work-operated gauge 113, see Fig. 6. Upon engagement of the end of the carton W with the gate 122 the lower plate 117 of the gauge 113 will slide with respect to the fixed plate 115 thereby causing the abutment 144 carried by the post 142 on the sliding plate to engage and operate the plunger 139 of the switch 134 to close the circuit of the electromagnet 75, see Figs. 21 and 24. Energization of the electromagnet 75 causes it to act through the link 76, lever 77 and bell-crank lever 81, see Fig. 3, to slide the clutch-member 29 against the action of the spring 30 to uncouple it from the pulley 25. Operation of the bell-crank-lever 81, acting through the connecting rod 88, rocks the lever 90 to engage the clutch-member 68 with the hub 65 of the gear 64. Simultaneously with the operation of the clutch-members 29 and 68 the slide bar 93 is moved to the right, as viewed in Fig. 2, whereby the latch-member 96 operated by the spring 97 engages the notch 94 in the slide bar to latch the connecting rod 88 against movement in the opposite direction. Thus, the feed rolls 18 are disconnected from the continuously-operating driving means and connected to the intermittently-operating driving means, causing rapid deceleration in the speed of the rolls by the action of the brake-band 58 on the clutch housing 54.

Figure 22:
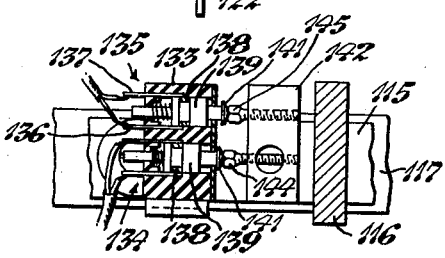
Fig. 22 is a view similar to Fig. 21 showing the second switch operated to energize the electromagnet for connecting the wire-stitching means to the prime mover.

Before the feed rolls 18 come to rest, however, the slide 117 of the work-operated gauge 113 will have been moved to the position illustrated in Fig. 22 to close the switch 135 and thereby energize the electromagnet 104. Energization of the electromagnet 104 causes it to operate through the link 105 and bell-crank-lever 102 to withdraw the pin 100 from the clutch 15 against the action of the spring 101, see Fig. 8. The pin 100 is latched in retracted position by the engagement of the latching member 106 with the pin 107 on the link 105, see Fig. 9. Withdrawal of the pin 100 causes the clutch 15 to couple the fly-wheel 12 to the drive shaft 11 for operating the stitcher head 10.

During the first half revolution of the drive shaft 11 the stitcher head 10 is operated to apply a stitch S to the work W and the eccentric 40 drives the pitman 41 through its forward stroke, see Fig. 10. Operation of the pitman 41 through its forward stroke carries the oscillating members 44 and 46 through their forward stroke, and the latter operating through the crank-arm 48 and link 51, see Fig. 2, operate the one-way clutch 50 through an idle stroke. During the forward stroke of the oscillating member 44 the pawl 151 rides on the lobe 155 of the release plate 154 during part of its stroke and thereafter engages a tooth on the ratchet-wheel 150 to rotate the control shaft 45 during the remainder of the stroke, see Fig. 10. During the second half revolution of the drive shaft 11 the pitman 41 is moved through its return stroke thereby rocking the oscillating member 44 through its return stroke. The key 47 of the tie-stitching mechanism being raised to the position illustrated in Fig. 17 by the arcuate lever 232 and cam 237 releases the oscillating member 46 from the oscillating member 44 whereby lost-motion between the parts occurs until the abutment 231 on the oscillating member 44 engages the side of the key. The motion of the oscillating member 46 is transmitted through the crank-arm 48, link 51, one-way clutch 59, shaft 55, clutch 68, gears 64 and 69, shaft 70, universal coupling 72, shaft 23 and shaft 20 connected thereto to rotate the feed rolls 18 and advance the work W with a reduced increment of movement.

The drive shaft 11 will then operate the stitcher head 10 to apply a second stitch closely adjacent the first stitch to provide a tie-stitch at the beginning of the row and the control shaft 45 is rotated simultaneously therewith. Rotative movement of the control shaft 45 acts to move the lobe 239 of the cam 237 from under the lug 236 of the arcuate lever 232 whereby the key 47 is rocked into engagement with the notch 230 in the flange of the oscillating member 44 to connect the oscillating members to operate as a unit. The stitching head 10 continues to operate to apply stitches and the oscillating members 44 and 46 continue to operate the work-feeding means to advance the work a normal increment of movement between stitches until the next to the last stitch is being driven. When the next to the last stitch is being driven the control shaft 45 will have been indexed around by the ratchet-wheel 150 to bring the lobe 240 of the cam 238 into engagement with the lug 236 to lift the arcuate lever 232 and key 47, whereby to cause the work W to be advanced with a reduced increment of movement between the next to the last and the last stitch to provide a tie-stitch at the end of the row.

During the application of the last stitch the control shaft 45 is again advanced and the arm 178, having been set in the proper notch 171 in the dial 170 for the particular number of stitches S to be applied during a stitching operation, will engage the cross-pin 191 of the frame 185 and rock it to the position illustrated in Fig. 15 to close the switch 202. Closing of the switch 202 energizes the electromagnet 164 which operates through the link 165 and bell-crank-lever 162, see Fig. 12, to engage the end of the link 160 with the adjustable abutment 111 on the rocking frame 108 and move the latter to the position illustrated in full lines in Fig. 9. This rocking movement of the frame 108 releases the pin 107 carried by the link 105, whereby the spring 101 projects the pin 100 into the clutch 15, see Fig. 8, to uncouple the fly-wheel 12 from the drive shaft 11 at the completion of the cycle of operation of the wire-stitching head 10 to apply the last stitch.

Simultaneously with the operation of the rocking frame 108 the bell-crank-lever 162, operating through the link 160, rocks the release plate 154 in counterclockwise direction, as viewed in Fig. 10, against the action of the spring 158. Rocking movement of the release plate 154 causes its lobes 155 and 156 to engage the pawls 151 and 153 and release them from engagement with the teeth on the ratchet-wheel 150. Upon release of the pawls 151 and 153 the spring 206, see Fig. 16, will rotate the control shaft 45 to return it to its initial position where its motion is arrested by the engagement of the shoulder 214 on the stop collar 212 with the abutment 213, see Fig. 13, any rebound of the parts being prevented by the engagement of the pin 223 with the notch 221 in the brake disk 219 on the control shaft, see Fig. 11.

Upon rocking movement of the release plate 154 the pin 166 on the arm 157 will engage the beveled cam-face 99 on the latch 96 and rock it to the position indicated in dash lines in Fig. 12 to release the connecting rod 88. Upon release of the connecting rod 88 the spring 30, see Figs. 3 and 4, will actuate the clutch-member 29 to engage its teeth 28 with the teeth 27 on the pulley 25 and, simultaneously, the lever 90 will be rocked by the movement of the connecting rod to disengage the clutch-member 68 from the hub 65 of the gear 64. Thus, the intermittently-operating driving means is disconnected from the work-feeding means and the continuously-operating driving means is connected thereto to rotate the feed rolls 18 at high speed and discharge the work from the machine. At the end of the return movement of the control shaft 45 the projecting end of the arm 175 on the dial 170 engages the cross-pin 191 carried by the frame 185 and rocks the latter to the position illustrated in Fig. 14 to release the plunger 205 of the switch 202. In case of failure of the switch 202 to operate, or if for any other reason the stitching head 10 continues its operation, the abutment 201 on the frame 185 will engage the plunger of the safety switch 203, see Fig. 2, to cause the latter to open the power line circuit to the machine, see Fig. 24.

A complete cycle of operations of the machine as above explained is again initiated by merely inserting another carton W to be stitched. The machine may be adjusted to apply any predetermined number of stitches S by merely turning the collar 169 on the control shaft 45 and rocking the arm 178 into engagement with the proper slot 171 as indicated by the index number. The tie-stitch cams 237 and 238 may be adjusted by loosening the set-screw 243 and turning the cam 238 with respect to the cam 237 until the proper index number on one alines with the set-mark on the other and then tightening the set-screw. It a tie-stitch is not required the set-screw 245 of the tie-stitch cam 237 may be loosened and the cams slid longitudinally on the shaft 45 to their inoperative position indicated by dash lines in Fig. 2.

It will be observed from the foregoing specification that the present invention provides a machine for stitching the seams of cartons or for similar work comprising continuously-operating driving means which is disconnected from the work-feeding means before the wire-stitching means is operated whereby to provide a time interval therebetween. It will be observed further that the present invention provides a freely movable work-operated gauge for controlling the disconnection of the continuously-operating driving means from the work-feeding means adapted to control electric circuits whereby a minimum resistance is offered to the advancement of the work to avoid jamming or scuffing of the carton. It will be observed still further that a greatly simplified control means and tie-stitch means is provided as compared to that illustrated and described in my prior application referred to above.

While a preferred form of the machine is herein shown and described it will be understood that modifications may be made in the construction and arrangement of its parts without departing from the spirit or scope of the invention. For example, other types of friction clutches may be used and equivalent operating parts are intended to be included within the scope of the present invention. Therefore, without limiting myself in this respect, I claim:

1. In a machine of the type indicated, a continuously-operating prime mover, wire-stitching means, work-feeding means driven from the prime mover, intermittently-operating means for driving the work-feeding means, means for disconnecting the work-feeding means from the prime mover, and means operated independently of and after the operation of the last-named means for connecting the wire-stitching means and intermittently-operating means to the prime mover whereby to provide a time interval between the operation of the disconnecting means and the operation of the connecting means.

2. In a machine of the type indicated, a prime mover, wire-stitching means, work-feeding means, continuously-operating means for driving the work-feeding means, intermittently-operating means for driving the work-feeding means, means for disconnecting the continuously-operating driving means from the work-feeding means and connecting the intermittently-operating driving means thereto, and means operated after the last-named means for connecting the intermittently-operating driving means to the prime mover whereby to provide a time interval between the disconnection of the continuously-operating driving means and the operation of the intermittent driving means by the prime mover.

3. In a machine of the type indicated, a prime mover, wire-stitching means, work-feeding means, continuously-operating means for driving the work-feeding means, intermittently-operating means for driving the work-feeding means, means for disconnecting the continuously-operating driving means from the work-feeding means and connecting the intermittently-operating driving means thereto, and means operated after the last-named means for connecting the wire-stitching means to the prime mover whereby to provide a time interval between the disconnection of the continuously-operating driving means and the operation of the wire-stitching means.

4. In a machine of the type indicated, a prime mover, wire-stitching means, work-feeding means, continuously-operating means for driving the work-feeding means, intermittently-operating means for driving the work-feeding means, means for disconnecting the continuously-operating driving means from the work-feeding means and connecting the intermittently-operating driving means thereto, and means operated after the last-named means for connecting the wire-stitching means and intermittently-operating driving means to the prime mover whereby to provide a time interval between the disconnection of the continuously-operating driving means and the operation of the wire-stitching means and intermittently-operating driving means.

5. In a machine of the type indicated, a prime mover, wire-stitching means, feeding means continuously engaging the work, continuously-operating means for driving the work-feeding means, intermittently-operating means for driving the work-feeding means, separate clutches for connecting the continuously-operating driving means and intermittently-operating driving means to the work-feeding means, means for simultaneously operating the clutches to disconnect the continuously-operating driving means from the work-feeding means and connecting the intermittently-operating driving means thereto, and means operated after the last-named means for connecting the wire-stitching means and intermittently-operating driving means to the prime mover.

6. In a machine of the type indicated, a prime mover, wire-stitching means, work-feeding means, continuously-operating means for driving the work-feeding means, intermittently-operating means for driving the work-feeding means, means controlled by the movement of the work for disconnecting the continuously-operating driving means from the work-feeding means, and a second means controlled by the movement of the work and operated independently of and after the operation of the last-named means for connecting the wire-stitching means and intermittently-operating driving means to the prime mover.

7. In a machine of the type indicated, wire-stitching means, work-feeding means, continuously-operating means for driving the work-feeding means, intermittently-operating means for driving the work-feeding means, means for disconnecting the continuously-operating driving means from the work-feeding means, electrical means for operating the last-named means, and a freely movable gauge operable by the movement of the work for controlling the electrical means.

8. In a machine of the type indicated, a continuously-operating prime mover, wire-stitching means, work-feeding means driven from the prime mover, intermittently-operating means for driving the work-feeding means, means for disconnecting the work-feeding means from the prime mover, an electromagnet for operating the last-named means, an electric circuit for the electromagnet, a switch in the electric circuit, a freely movable gauge operable by the work for closing the switch to energize the circuit, and means for connecting the wire-stitching means and intermittently-operating means to be driven from the prime mover.

9. In a machine of the type indicated, a prime mover, wire-stitching means, work-feeding means, means continuously-operated by the prime mover for driving the work-feeding means, means intermittently-operated by the prime mover for driving the work-feeding means, clutches for disconnecting the continuously-operating driving means from the work-feeding means and connecting the intermittently-operating driving means thereto, an electromagnet for operating the last-named means, an electric circuit for the electromagnet, a switch in the circuit, and a freely movable gauge operable by the work for closing the switch to energize the circuit.

10. In a machine of the type indicated, a prime mover, wire-stitching means, work-feeding means, continuously-operating means for driving the work-feeding means, intermittently-operating means for driving the work-feeding means, clutch means for simultaneously disconnecting the continuously-operating driving means from the work-feeding means and connecting the intermittently-operating driving means thereto, a second clutch means for connecting the wire-stitching means and intermittently-operating driving means to be driven from the prime mover, electromagnets for operating the clutch means, electric circuits for the electromagnets, and switches in the circuits operable by the work, said switches being closed in timed sequence by the work to operate the first clutch means and thereafter operate the second clutch means.

11. In a machine of the type indicated, a prime mover, wire-stitching means, work-feeding means, means driven from the prime mover and normally connected to the work-feeding means to cause the work to be fed continuously at high speed, a clutch connecting the last-named means to the work-feeding means, means operated from the wire-stitching means and adapted to operate the work-feeding means to advance the work intermittently, a clutch for connecting the last-named means to the work-feeding means, means for simultaneously operating the clutches to connect one driving means to the work-feeding means and disconnect the other driving means therefrom, a third clutch for connecting the wire-stitching means to the prime mover, separate electromagnets for actuating the operating means for the first two clutches and the third clutch, electric circuits for the electromagnets, and switches in the circuits operable by the work, said switches being closed in timed sequence by the work to operate the first and second clutches and thereafter operate the third clutch.

12. In a machine of the type indicated, a prime mover, wire-stitching means, means for feeding the work to the wire-stitching means, means for connecting the prime mover to the wire-stitching means and work-feeding means, means for disconnecting the prime mover from the wire-stitching means and work-feeding means, an electromagnet for operating the last-named means, an electric circuit for the electromagnet, a switch in the circuit, and control means operated in timed relation to the operation of the wire-stitching means for operating the switch to energize the electromagnet.

13. In a machine of the type indicated, a prime mover, wire-stitching means, means for feeding the work to the wire-stitching means, means for connecting the prime mover to the wire-stitching means and work-feeding means, means for disconnecting the prime mover from the wire-stitching means and work-feeding means, an electromagnet for operating the last-named means, an electric circuit for the electromagnet, a switch in the circuit, control means operated in timed relation to the operation of the wire-stitching means for operating the switch to energize the electromagnet, and means for adjusting the control means to operate the switch after any predetermined number of stitches have been applied.

14. In a machine of the type indicated, a prime mover, wire-stitching means, means for feeding the work to the wire-stitching means, a clutch between the prime mover and wire-stitching means, means normally acting to hold the clutch disengaged, means operated by the work for actuating the clutch to connect the prime mover to the wire-stitching means and work-feeding means, a latch for retaining the clutch connected, a latch-trip for releasing the clutch, an electromagnet for operating the latch-trip, an electric circuit for the electromagnet, a switch in the circuit, and control means operated in timed relation to the operation of the wire-stitching means for operating the switch to energize the electromagnet.

15. In a machine of the type indicated, a prime mover, wire-stitching means, means for feeding the work to the wire-stitching means, means for connecting the prime mover to the wire-stitching means and work-feeding means, means for disconnecting the prime mover from the wire-stitching means and work-feeding means, an electro-magnet for operating the last-named means, an electric circuit for the electromagnet, a switch in the circuit, control means operated in timed relation to the operation of the wire-stitching means for operating the switch to energize the electromagnet, means for returning the control means to initial position, and means operated by the electromagnet for initiating the operation of the means for returning the control means.

16. In a machine of the type indicated, a prime mover, wire-stitching means, means for feeding the work to the wire-stitching means, means for connecting the prime mover to the wire-stitching means and work-feeding means, means for disconnecting the prime mover from the wire-stitching means and work-feeding means, an electromagnet for operating the last-named means, an electric circuit for the electromagnet, a switch in the circuit, control means operated in timed relation to the operation of the wire-stitching means, means for returning the control means to initial position, an arm on the control means for operating the switch to energize the electromagnet, means operated by the electromagnet for initiating the operation of the means for returning the control means, and a second arm on the control means for operating the switch to open the circuit at the end of the return movement of the control means to initial position.

17. In a machine of the type indicated, a prime mover, wire-stitching means, means for feeding the work to the wire-stitching means, starting means operated by the work for connecting the prime mover to drive the wire-stitching means and work-feeding means, control means operated in timed relation to the operation of the wire-stitching means, means for returning the control means to initial position, an electromagnet for arresting the operation of the wire-stitching means and initiating operation of the means for returning the control means to initial position, an electric circuit for the electromagnet, a switch in the electric circuit, and an adjustable arm on the control means for operating the switch to energize the electromagnet.

18. In a machine of the type indicated, a prime mover, wire-stitching means, work-feeding means, continuously-operating means for driving the work-feeding means, intermittently-operating means for driving the work-feeding means, means for disconnecting the continuously-operating driving means from the work-feeding means, a latch for engaging the last-named means to retain the continuously-operating driving means disconnected from the work-feeding means, means operative after the operation of the disconnecting means for connecting the wire-stitching means and intermittently-operating means to the prime mover, and electromagnet-operated means controlled by the operation of the wire-stitching means for disconnecting the wire-stitching means and intermittently-operating means from the prime mover and tripping the latch to permit the continuously-operating driving means to be connected to the work-feeding means.

19. In a machine of the type indicated, a prime mover, wire-stitching means, work-feeding means, continuously-operating means for driving the work-feeding means, intermittently-operating means for driving the work-feeding means, means for disconnecting the continuously-operating means from the work-feeding means, a latch for engaging the last-named means to retain the continuously-operating driving means disconnected from the work-feeding means, electromagnet-operated means for connecting the wire-stitching means and intermittently-operating means to the prime mover, a circuit for the electromagnet, a switch in the circuit operable by the work for energizing the electromagnet, control means operated in timed relation to the operation of the wire-stitching means, means for returning the control means to initial position, electromagnet-operated means for disconnecting the wire-stitching means and intermittently-operating driving means from the prime mover, said electromagnet-operated means acting to initiate the return of the control means and to trip the latch to permit the continuously-operating driving means to be connected to the work-feeding means, an electric circuit for the last-named electromagnet, and a switch in the circuit operated by the control means to energize said electromagnet.

20. In a machine of the type indicated, a prime mover, wire-stitching means, means for feeding the work to the wire-stitching means, a clutch for connecting the prime mover to the wire-stitching means and work-feeding means, an electromagnet for operating the clutch, a circuit for the electromagnet, a switch in the circuit adapted to be operated by the movement of the work, control means operated in timed relation to the operation of the wire-stitching means, a second electromagnet for operating the clutch to disconnect the wire-stitching means and work-feeding means from the prime mover, an electric circuit for the second electromagnet, and a switch in the circuit operated by the control means to stop a stitching operation.

21. In a machine of the type indicated, a prime mover, wire-stitching means, work-feeding means, continuosly-operating means for driving the work-feeding means, means operated intermittently from the wire-stitching means for driving the work-feeding means, means for disconnecting the continuously-operating driving means from the work-feeding means and connecting the intermittently operated driving means thereto, an electromagnet for operating the last-named means, a clutch for connecting the prime mover to the wire-stitching means, an electromagnet for operating the clutch, work-operated switches for energizing the electromagnets in timed sequence, control means operated in timed relation to the wire-stitching means, an electromagnet for operating the clutch connecting the prime mover to the wire-stitching means to arrest operation of the latter, and a switch operated by the control means for energizing the last-named electromagnet.

22. In a machine of the type indicated, wire-stitching means, work-feeding means, means for initiating operation of the wire-stitching means, and means for simultaneously arresting the operation of the wire-stitching means and work-feeding means comprising an electromagnet, an electric circuit for the electromagnet, a switch in the circuit, a rockable member for operating the switch, and a control member operated in timed relation to the wire-stitching means and carrying a projection for actuating the rockable member.

23. In a machine of the type indicated, wire-stitching means, work-feeding means, means for initiating operation of the wire-stitching means, and means for arresting the operation of the wire-stitching means comprising an electromagnet, an electric circuit for the electromagnet, a switch in the circuit, a rockable member for operating the switch, a control member operated in timed relation to the wire-stitching means and having a projection for actuating the rockable member, and means for adjusting the position of the projection on the control means to operate the switch after any predetermined number of stitches have been applied.

24. In a machine of the type indicated, wire-stitching means, work-feeding means, means for initiating operation of the wire-stitching means, and means for arresting the operation of the wire-stitching means comprising an electromagnet, an electric circuit for the electromagnet, a switch in the circuit, a rockable member for operating the switch, a control member operated in timed relation to the wire-stitching means, means for returning the control member to initial position, said control member having an arm for actuating the rockable member to operate the switch and thereby energize the electromagnet, means operated by the electromagnet for initiating operation of the means for returning the control means, and a second arm on the control member for actuating the rockable member to release the switch.

25. In a machine of the type indicated, wire-stitching means, work-feeding means, means for initiating operation of the wire-stitching means, and means for arresting the operation of the wire-stitching means comprising an electromagnet, an electric circuit for the electromagnet, a switch in the circuit, a rockable member for operating the switch, a control member operated in timed relation to the wire-stitching means, means for returning the control member to initial position, said control member having an arm for actuating the rockable member to operate the switch and thereby energize the electromagnet, means operated by the electromagnet for initiating operation of the means for returning the control means, a second arm on the control member for actuating the rockable member to release the switch, and means for relatively adjusting the arms.

26. In a machine of the type indicated, wire-stitching means, work-feeding means adapted to feed the work a normal increment of movement or a reduced increment of movement between adjacent stitches, driving means for operating the wire-stitching means and work-feeding means in timed relationship, tie-stitch means for controlling the operation of the feeding means to reduce the increment of movement of the work by the feeding means between certain stitches, a control shaft operated in timed relation to the wire-stitching means, a pair of separate cams on the control shaft for operating the tie-stitch means at the beginning and end of a row of stitches, and means for relatively adjusting the cams in angular relationship on the shaft to adapt a tie-stitch to be applied at the beginning and end of a row of any predetermined number of stitches.

27. In a machine of the type indicated, wire-stitching means, work-feeding means, driving means for operating the wire-stitching means and work-feeding means in timed relationship, tie-stitch means for controlling the operation of the feeding means to reduce the increment of movement of the work by the feeding means between certain stitches, a control shaft operated in one direction in timed relation to the wire-stitching means, means for operating the control shaft in the opposite direction to return it to initial position, and a pair of cams on the control shaft for operating the tie-stitch means at the beginning and end of a row of stitches.

28. In a machine of the type indicated, wire-stitching means, work-feeding means, driving means for operating the wire-stitching means and work-feeding means in timed relationship, tie-stitch means for controlling the operation of the work-feeding means to reduce the increment of movement of the work between certain stitches, a control shaft operated in one direction in timed relation to the wire-stitching means, means for operating the control shaft in the opposite direction to return it to initial position, a cam on the control shaft having a lobe for operating the tie-stitch means at the beginning of a row of stitches, a second cam on the control shaft having a lobe for operating the tie-stitch means at the end of the row of stitches, and means for relatively adjusting the second cam with respect to the first cam whereby to operate the tie-stitch means after any predetermined number of stitches have been applied.

29. In a machine of the type indicated, wire-stitching means, work-feeding means, driving means for operating the wire-stitching means and work-feeding means in timed relationship, tie-stitch means for controlling the operation of the work-feeding means to reduce the increment of movement of the work between certain stitches, a control shaft operated in one direction in timed relation to the wire-stitching means, means for operating the control shaft in the opposite direction to return it to initial position, a cam on the control shaft having a lobe for operating the tie-stitch means at the beginning of a row of stitches, said cam having a hub, a second cam mounted on the hub of the first cam for operating the tie-stitch means at the end of a row of stitches, said cams being relatively adjustable to adapt the tie-stitch means to be operated after any predetermined number of stitches, and indicia on the hubs of the two cams for indicating the relative position thereof.

GEORGE H. HARRED.